Dec. 29, 1970 L. PÜTTER ET AL 3,550,262

METHOD OF SIMULTANEOUSLY PRODUCING A MULTIPLICITY OF SEMICONDUCTOR DEVICES

Filed Dec. 1, 1967

United States Patent Office 3,550,262

Patented Dec. 29, 1970

3,550,262

METHOD OF SIMULTANEOUSLY PRODUCING A MULTIPLICITY OF SEMICONDUCTOR DEVICES

Lothar Pütter and Manfred Riermeier, Munich, Germany, assignors to Siemens Aktiengesellschaft, a corporation of Germany Filed Dec. 1, 1967, Ser. No. 687,966
Claims priority, application Germany, Dec. 3, 1966, S 107,254
Int. Cl. B01j *17/00;* H01l *1/14, 5/02*
U.S. Cl. 29—591 7 Claims

ABSTRACT OF THE DISCLOSURE

Method of simultaneously producing a multiplicity of semiconductor devices formed of monocrystalline semiconductor members such as of silicon or germanium, for example, includes cutting in at least one metallic support strip of a multiplicity of bosses spaced from one another a predetermined distance, seating semiconductor members respectively on the bosses, placing end contact members respectively on the semiconductor members, simultaneously soldering the respective members to one another, subjecting all of the members assembled on the strip to further treatment, and thereafter pressing the bosses with the members soldered thereto out of the strip member.

Our invention relates to method of simultaneously producing a multiplicity of semiconductor devices.

In the copending application, Ser. No. 669,661, filed Sept. 21, 1967 of Gerhard Lutz, assigned to the same assignee as that of the instant application, there is disclosed a method of simultaneously producing a multiplicity of semiconductor devices formed of monocrystalline semiconductor members such as of silicon or germanium, for example, wherein a multiplicity of the semiconductor members are seated spaced from one another a predetermined distance on at least one metallic support strip member, end contact members are respectively placed on the semiconductor members and are soldered to one another respectively to form a single unit, simultaneously, all of the semiconductor members assembled on the strip member are subjected to further treatment, and, thereafter, the strip member is severed at locations intermediate the seated positions of the semiconductor members.

The production process is considerably simplified, especially when solder-coated support strip members and end contact members are used. A multiplicity of semiconductor members are thereby subjected simultaneously to the same treatment or further processing step, and can be supplied, without requiring any additional equipment, to a succeeding treatment location. Thus, the entire unit after being soldered together can be etched as a whole, and a protective lacquer can be coated immediately thereon. Finally, after all the processing steps have been completed, the unit can be severed along lines located between the individual semiconductor members of the unit.

It is an object of our invention to provide an improvement in the aforedescribed method of copending application Ser. No. 669,661 which will afford a considerable saving of time and equipment, thereby assuring a greater production of rectifiers, for example, provided with contacts and further processed without any trouble.

With the foregoing and other objects in view, in accordance with our invention, we cut a multiplicity of wart-like knobs or bosses into the support strip member to serve as seats for the semiconductor members, and, after all the processing steps have been completed we press them completely out of the support strip members either one after another or simultaneously.

In accordance with another aspect of our invention, all of the method steps are carried out on the multiplicity of individual components simultaneously without having to touch the components or to bring any tools or devices into contact therewith.

In accordance with yet another aspect of the invention, extremely simple tools, which can serve simultaneously as a soldering form, are employed for assembling the components on the support strip member.

The method of this invention is very advantageous with regard to the deposition of a protective lacquer coating which is not supposed to wet the outer sides of the two metallic electrodes of the semiconductor members because subsequent soldering operations would thereby be impaired. One side of one electrode is formed by the rear or under-side of the support strip member which necessarily remains free of lacquer when the lacquer is solely applied on that side of the support strip member on which the semiconductor members are located on top of the individual bosses. The outer side of the other electrode remains free of the lacquer which is drawn by surface tension from the support strip member solely on the semiconductor wafer as well as on the lower and lateral surfaces of the electrodes i.e. the end contact member and the separated boss. In addition, the upper electrode can be provided with a somewhat larger diameter than that of the semiconductor member.

In accordance with other aspects of our invention, after the lacquer has hardened, the support strip member is completely immersed in a tin-bath to remove the coating of soldering lead from the support strip member and from the end contact members. The junctions or terminals can then be soldered with tin or a tin alloy to the electrodes of the components that have been pressed out of the support strip member. The melting point of tin is located between the maximum operating temperatures of the semiconductor rectifier member at 180° C. and the melting point of lead at 330° C. If tin solder were used before removing the layer of lead, the consequent formation of a lead-tin eutectic would have a melting point below the maximum operating temperature of the semiconductor device, such as a rectifier. To solder the junctions or terminals to the electrodes, the components can be completely immersed briefly, with the terminals located thereon, into the molten solder. Both of these method steps are also employable advantageously for producing individual component members.

Other features which are considered as characteristic for the invention are set forth in the appended claims.

Although the invention is illustrated and described herein as method of simultaneously producing a multiplicity of semiconductor devices, it is nevertheless not intended to be limited to the details shown, since various modifications may be made therein without departing from the spirit of the invention and within the scope and range of equivalents of the claims.

The method of the invention, together with additional objects and advantages thereof will be best understood from the following description when read in connection with the accompanying drawing, in which.

Figure 1:
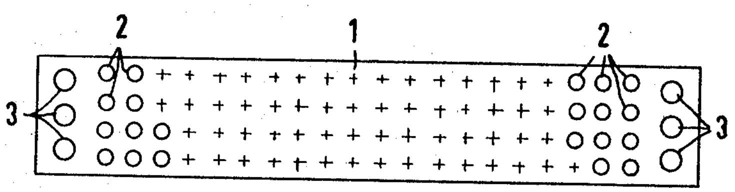
FIG. 1 is a plan view of a support strip member according to the invention.

Referring now to the drawing, there is shown in FIG. 1 a plan view of a support strip member 1 in accordance with our invention, provided with a multiplicity of wart-like bosses 2, having a diameter of 2 to 3 mm. produced after the strip member has been coated with nickel and lead. Since the bosses 2 are first cut out after the strip member has been subjected to surface treatment with the nickel and lead, the lead coatings, which serve as solder located on the surfaces of the bosses 2, are separated from the layers of lead remaining on the surfaces of the support strip member 1. Broad flowing of the solder is thereby prevented. The soldered strip member 1 is further provided with guide holes 3 at the ends thereof whereby the strip member can be suitably mounted on the base plate of a tool such as the soldering form of the aforementioned copending application, having vertically extending prongs disposed so that they are in registry with the guide holes 3. The support strip member 1 consists, for example, of iron sheet metal coated with nickel and lead and having a thickness of 0.5 mm.

Figure 2:
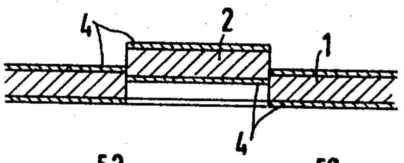
FIG. 2 is a sectional view through one of the bosses formed in the support strip member of FIG. 1.

In FIG. 2 there is shown a cross-sectional view of one of the bosses formed in the support strip member 1 of FIG. 1. The boss 2 is shown as being partly punched or embossed in the strip member 1. The separated lead layer 4 is clearly shown in FIG. 2. All of the bosses 2 can be simultaneously pressed into the strip member 1 by a suitable multiple embossing or punching tool.

Figure 3:
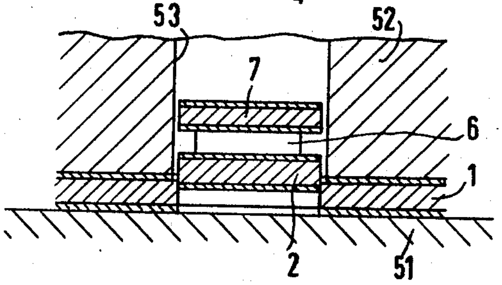
FIG. 3 is a view similar to that of FIG. 2 of the boss surmounted by a semiconductor wafer and an end contact member within a tool.

Thereafter, as shown in FIG. 3, the support strip member 1 is placed, with the bosses 2 thereof extending upwardly, on top of a base plate 51 of an auxiliary tool, such as the soldering form of the aforementioned copending application. The auxiliary tool has an upper portion 52, corresponding to the pattern member of the aforementioned copending application, formed with a multiplicity of openings 53 having substantially the same diameter and distribution as the diameter and distribution of the bosses 2 of the support strip member 1. This upper portion 52 is superposed on the upper surface of the support strip member 1, as shown in FIG. 3, so that the bosses 2 extend into the openings 53 in the upper portion 52 of the auxiliary tool.

Semiconductor wafers 6 of monocrystalline silicon, for example, provided with a pn junction are inserted within the openings 53 on top of the bosses 2. The relatively thin semiconductor wafers, even for great tolerances, are unable to slip between the upper portion 52 of the auxiliary tool and the support strip member 1. The openings 53 can be provided with a non-illustrated closure such as a plug which extends so deeply below the upper edge of the opening 53, as viewed in FIG. 3, that just one semiconductor wafer 6 respectively fits into the thus-formed cavities. The semiconductor wafers 6 can thus be piled onto the flat upper surface of the upper portion 52 of the auxiliary tool and shaken respectively into the openings 53. After the non-illustrated closures are removed from the openings 53, the semiconductor wafers 6 then drop onto the bosses 2. With the aid of similar non-illustrated closure devices, end contact members 7 can be inserted individually into the respective openings 53. Each of the end contact members 7 is provided on both sides thereof with a nickel layer superposed with a lead layer 4. More than one end contact member can be placed on each semiconductor member 6 with an additional auxiliary tool, if the semiconductor wafer has more than one corresponding electrode surface.

In the arrangement shown in FIG. 3, the individual elements are heated together in the same auxiliary tool to the soldering temperature of the lead. Accordingly, the lead of the layers 4 is melted and, after being permitted to cool, a rigid junction of the semiconductor wafer 6 with the bosses 2 and the end contact member 7 is produced.

Figure 4:
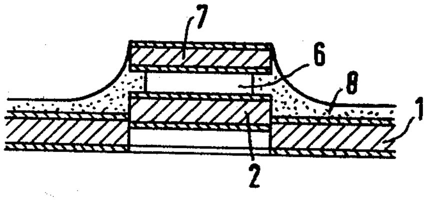
FIG. 4 is another view of FIG. 3 with the tool removed and the assembled parts treated with a layer of lacquer.

Thereafter, the support strip member 1, with the semiconductor wafers 6 and end contact members 7 soldered to the respective bosses 2 thereof, is removed from the auxiliary tool 51, 52, is etched and then lacquered. The lacquer is applied in the simplest manner onto the support strip member 1 intermediate the bosses 2 with the aid of several non-illustrated comb-shaped nozzles. The lacquer then flows, due to surface tension, around the semiconductor wafers 6, as shown in FIG. 4, without coming in contact with the upper surface of the end contact members 7.

After being lacquered, the support strip member 1 with all the semiconductor wafers is subjected to a heat treatment to bake in the lacquer. Thereafter, the lead layers remaining exposed are alloyed away in a tin bath.

Figure 5:
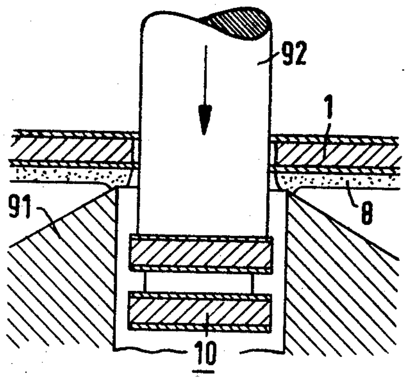
FIG. 5 is an inverted view of FIG. 4, wherein the assembled device is shown punched by a punching tool out of the support strip member.

Then, the bosses 2 are completely pressed or punched out of the support strip member 1, as shown in FIG. 5, with the aid of a multiple tool 91, 92 in a single operation. The thus-formed semiconductor device 10 is capable of being kept in storage for virtually any desired length of time, and can, as required, be soldered with terminal leads, for example, by being completely immersed in molten solder together with the lead terminals located adjacent the exposed surfaces of the respective end contact member and the punched-out boss, and then withdrawn so as to permit the soldered junctions to cool.

We claim:

1. Method of simultaneously producing a multiplicity of semiconductor devices formed of monocrystalline semiconductor members such as of silicon or germanium, for example, which comprises coating at least one metallic support strip and a multiplicity of end contact members with a layer of solder on both sides thereof, cutting in the support strip a multiplicity of bosses spaced from one another a predetermined distance, seating semiconductor members respectively on the bosses, placing the end contact members respectively on the semiconductor members, simultaneously soldering the respective members to one another, subjecting all of the members assembled on the strip to further treatment, and thereafter pressing the bosses with the members soldered thereto out of the strip member.

2. Method according to claim 1 wherein the layers of solder are formed of material selected from the groups consisting of lead and lead alloys.

3. Method according to claim 2 which includes immersing the support strips in a tin bath after all the members assembled on the strip have been subjected to further treatment including covering part of the lead layers but before the bosses with the members soldered thereto have been pressed out of the strip, so as to remove the remaining exposed lead layers therefrom.

4. Method according to claim 3 wherein the further treatment comprises etching the lead layers and lacquering part of the lead layers.

5. Method of simultaneously producing a multiplicity of semiconductor devices formed of monocrystalline semiconductor members such as of silicon or germanium, for example, which comprises cutting in at least one metallic support strip, a multiplicity of bosses spaced from one another a predetermined distance, seating semiconductor members respectively on the bosses, placing end contact members respectively on the semiconductor members, simultaneously soldering the respective members to one another, subjecting all of the members assembled on the strip to further treatment, thereafter pressing the bosses with the members soldered thereto out of the strip member whereby the bosses with the semiconductor members and the end contact members respectively soldered thereto form semiconductor devices, and soldering terminals with material selected from the group consisting of lead and lead alloys to the individual semiconductor devices after they have been pressed out of the support strip.

6. Method according to claim 5 wherein the semiconductor devices with the terminals disposed thereon are completely immersed in molten tin solder briefly for soldering the terminals on the respective semiconductor devices.

7. Method of producing a semiconductor device from a semiconductor member, on both sides of which metallic electrodes are soldered with a material selected from the group consisting of lead and lead alloy, which comprises applying a lacquer coating to the semiconductor device for protecting the same, immersing the semiconductor device entirely in a tin bath to remove any exposed solder therefrom, and thereafter immersing the semiconductor member with terminals disposed thereon in molten solder consisting of material selected from the group consisting of tin or tin alloy.

References Cited

UNITED STATES PATENTS

| | | | |
|---|---|---|---|
| 3,004,094 | 10/1961 | Haessly. | |
| 3,270,399 | 9/1966 | Ohntrup. | |
| 3,276,854 | 10/1966 | Felker et al. | 29—589 |
| 3,281,628 | 10/1966 | Bauer et al. | 29—589 |
| 3,292,240 | 12/1966 | McNutt et al. | 29—589 |
| 3,330,026 | 7/1967 | Best et al. | 29—589 |

JOHN F. CAMPBELL, Primary Examiner

R. B. LAZARUS, Assistant Examiner

U.S. Cl. X.R.

29—589, 628, 630